C. E. DATH.
FRICTION GEAR.
APPLICATION FILED OCT. 18, 1915.
1,222,936.
Patented Apr. 17, 1917.
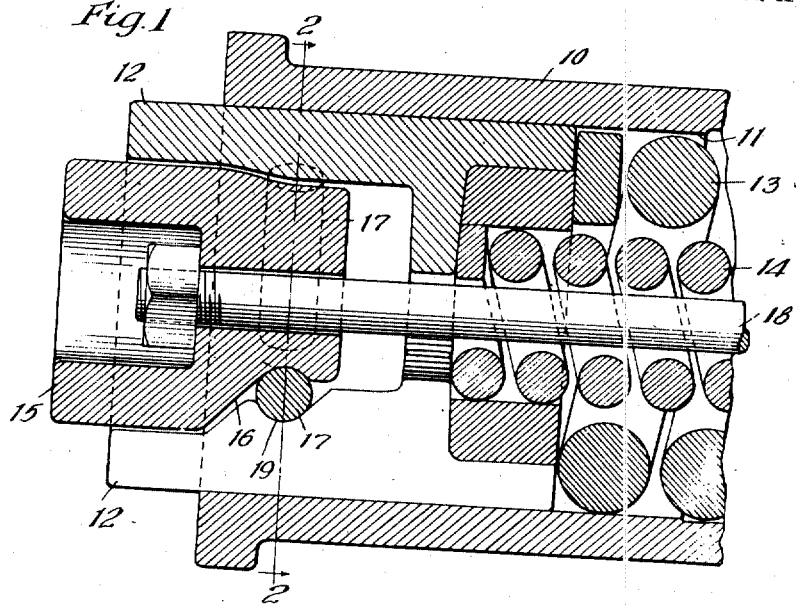
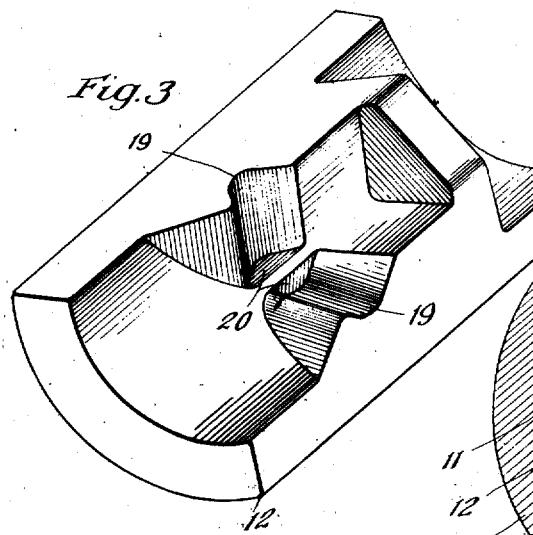
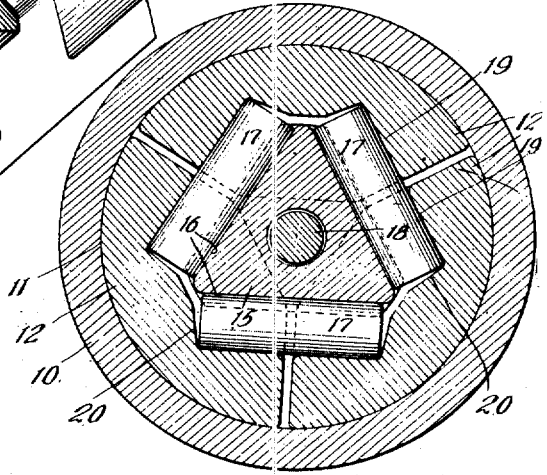
WITNESS
Wm. Geiger
INVENTOR.
Charles E. Dath
BY George D. Knight
ATTORNEY

UNITED STATES PATENT OFFICE.

CHARLES E. DATH, OF CHICAGO, ILLINOIS, ASSIGNOR TO WILLIAM H. MINER, OF CHAZY, NEW YORK.

FRICTION-GEAR.

1,222,936.  Specification of Letters Patent.  Patented Apr. 17, 1917.

Application filed October 18, 1915. Serial No. 56,415.

*To all whom it may concern:*

Be it known that I, CHARLES E. DATH, a citizen of the United States, residing at Chicago, in the county of Cook and State of Illinois, have invented a certain new and useful Improvement in Friction-Gears, of which the following is a full, clear, concise, and exact description, reference being had to the accompanying drawings, forming a part of this specification.

This invention relates to improvements in friction gears.

An object of the invention is to provide a novel arrangement of the anti-friction rollers in those types of friction draft gears which employ friction shoes, wedges and anti-friction rollers between the wedges and shoes and, more particularly, the object of the invention is to so arrange the anti-friction rollers as to insure perfect alinement of the shoes and wedge and also to maintain a continuous contact between the coöperating friction surfaces of the shoes and shell.

The invention, furthermore, consists in improvements in the parts and devices and in the novel combinations of the parts and devices herein shown, described and claimed.

In the drawing forming a part of the specification, Figure 1 is a longitudinal, sectional view of a portion of a friction draft gear showing my improvement in connection therewith. Fig. 2 is a transverse, sectional view of the improved gear, the section being taken substantially on the line 2—2 of Fig. 1, and Fig. 3 is a detailed perspective view of one of the friction shoes.

In said drawing, 10 denotes a cylindrical friction shell having an interior friction surface 11 with which coöperate a plurality of friction shoes 12—12, the latter having exterior cylindrical surfaces coöperating with the friction surface 11. Movement of the friction shoes relatively to the friction cylinder is resisted by springs 13 and 14, it being understood that the latter are mounted within a spring casing which is preferably formed integrally with the shell 10, the spring casing having a rear wall against which the springs 13 and 14 bear. A wedge 15 is employed, the same having a plurality of wedge acting faces 16—16, the number of said faces 16 corresponding to the number of shoes 12. A plurality of anti-friction rollers 17—17 are interposed between the wedge 15 and the friction shoes in a manner hereinafter described. All the parts are held in assembled relation and the springs preferably under an initial compression by means of a bolt 18.

Heretofore, in friction gears employing anti-friction rollers between a wedge and friction shoes, each roller has been in engagement with a single shoe, the arrangement being such that a radius drawn from the axis of the gear perpendicular to a wedge face would pass through substantially the center of the friction shoe. In my arrangement, each anti-friction roller 17 is so located that it bears upon adjacent wedge faces 19—19 of two friction shoes, each friction shoe 12 having two wedge faces 19, the same being disposed at an angle to each other and located near the longitudinal edges of the friction shoes. Each friction shoe 12 is provided with a longitudinally arranged shoulder 20 at the inner edge of each wedge face 19, so that the rollers 17 will be held in proper position and also the shoes.

In the drawings, I have shown three friction shoes and a wedge having three wedge faces, so that each shoe engages slightly less than 120° of the friction surface of the cylinder and the wedge is turned to an angle about 60° in advance of the position it has heretofore usually occupied. Or, stated in another manner, a radius drawn from the axis of the gear to the center of a shoe will bisect the angle formed by two adjacent wedge faces on the wedge, instead of said radius being perpendicular to a wedge face, as has heretofore been customary.

With my improved construction, it will be seen that each friction shoe is acted upon by two rollers and pressure is applied thereto from two faces of the wedge, with the result that the friction shoes will be forced outwardly into engagement with the cylindrical surface so as to engage the latter over a maximum area and there will be no danger of any shoe remaining inactive or not being properly actuated. Furthermore, as heretofore described, the proper alinement of the shoes and wedges is maintained.

I claim:

1. In a friction draft gear, the combination with a friction shell, a wedge and a plurality of friction shoes coöperable therewith, of a plurality of anti-friction rollers interposed between said shoes and wedge, said rollers corresponding in number to the number of shoes, the axes of said rollers extending in a plane perpendicular to the axis of the gear, each of said rollers engaging two shoes.

2. In a friction draft gear, the combination with a friction shell, a plurality of friction shoes coöperable therewith, and a single piece wedge, of a plurality of anti-friction rollers interposed between said wedge and shoes, the number of said rollers corresponding to the number of shoes and each roller bearing upon adjacent portions of two shoes.

3. In a friction draft gear, the combination with a friction shell, friction shoes coöperating therewith, and a wedge, of anti-friction rollers interposed between said wedge and shoes, each of said shoes having a plurality of wedge faces and provided also with shoulders adjacent each wedge face, said shoulders being engaged by the ends of the rollers.

4. In a friction draft gear, the combination with a friction shell, a wedge and a plurality of friction shoes coöperable therewith, of a plurality of anti-friction rollers interposed between said shoes and wedge, the axes of said rollers extending in a plane perpendicular to the axes of the gear, each of said rollers engaging two shoes.

5. In a friction gear, the combination with a cylindrical friction shell, of a wedge having a regular polygon cross section at the wedge portion thereof, a plurality of friction shoes having cylindrical outer friction surfaces coöperating with said shell, the number of said shoes equaling the number of sides to said polygonal cross section of the wedge, and anti-friction rollers interposed between the wedge and shoes, the arrangement of shoes, rollers and wedge being such that a radius extending from the axis of the cylinder to the center of a friction shoe will substantially bisect the angle between two adjacent sides of the polygonal section of the wedge and pass between the ends of adjacent rollers.

6. In a friction gear, the combination with a cylindrical friction shell, of a wedge, triangular shape in cross section and having three wedge faces at an angle of 60° to each other, three friction shoes each of which has a cylindrical surface engaging approximately 120° of the friction surface of the cylinder, and three anti-friction rollers interposed between the wedge and shoes, the arrangement of shoes relatively to the wedge being such that a radius drawn from the axis of the shell perpendicular to one of the wedge faces will pass between the adjacent longitudinal edges of two friction shoes and be substantially perpendicular to the corresponding anti-friction roller.

7. In a friction gear, the combination with a friction cylinder, of a plurality of friction shoes coöperable therewith, a wedge and a plurality of anti-friction rollers interposed between said wedge and shoes, the number of wedge faces on said wedge and the number of rollers corresponding to the number of friction shoes, each of said rollers engaging one wedge face on the wedge on one side and two friction shoes on the opposite side.

In witness that I claim the foregoing I have hereunto subscribed my name this 29th day of September, 1915.

CHARLES E. DATH.